United States Patent
Chatain et al.

(10) Patent No.: US 9,873,214 B2
(45) Date of Patent: Jan. 23, 2018

(54) DEVICE AND METHOD FOR EXTRUSION OF A SOLID BODY

(71) Applicant: COMMISSARIAT A L'ENERGIE ATOMIQUE ET AUX ENERGIES ALTERNATIVES, Paris (FR)

(72) Inventors: Denis Chatain, Saint Ismier (FR); Jean-Paul Perin, Seyssins (FR); Marc Chichoux, Voiron (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 883 days.

(21) Appl. No.: 13/934,917

(22) Filed: Jul. 3, 2013

(65) Prior Publication Data

US 2014/0008829 A1     Jan. 9, 2014

(30) Foreign Application Priority Data

Jul. 4, 2012   (FR) ..................... 12 01883

(51) Int. Cl.
*B29C 47/10*     (2006.01)
*B29C 47/80*     (2006.01)
(Continued)

(52) U.S. Cl.
CPC ........ *B29C 35/007* (2013.01); *B29C 47/0004* (2013.01); *B29C 47/0071* (2013.01);
(Continued)

(58) Field of Classification Search
CPC ............ B29C 47/0004; B29C 47/0071; B29C 47/0073; B29C 47/0813; B29C 47/1063; B29C 47/1072; B29C 47/14; B29C 47/805; B29C 47/864; B29C 47/866; B29C 47/92; B29C 2947/92704; B29C 2947/92857; B29C 2947/92876; B29C 2947/92904;
(Continued)

(56) References Cited

U.S. PATENT DOCUMENTS

2004/0071266 A1     4/2004   Orsini et al.

FOREIGN PATENT DOCUMENTS

JP       2002148377 A  *  5/2002

OTHER PUBLICATIONS

English Abstract of JP 2002148377 A, May 2002.*

(Continued)

*Primary Examiner* — Yogendra Gupta
*Assistant Examiner* — Joseph Leyson
(74) *Attorney, Agent, or Firm* — Oliff PLC

(57) ABSTRACT

The extrusion device of a solid film comprises a cell provided with an input opening of a material designed to form the solid film, and an output opening of the solid film from the cell. The device comprises a first heat exchanger for applying a first temperature to the output opening and a second heat exchanger for applying a second temperature in a first zone of the cell distinct from the output opening and a control circuit imposing first and second sets of first and second temperatures. The first set enables a volume of the material in solid phase to be formed. The second set enables a temperature gradient to be generated in the volume so as to generate a pressure forcing extrusion of the solid film via the output opening.

13 Claims, 2 Drawing Sheets

(51) Int. Cl.

| | | |
|---|---|---|
| *B29C 47/86* | (2006.01) | |
| *B29C 35/00* | (2006.01) | |
| *B29C 47/08* | (2006.01) | |
| *F25J 1/00* | (2006.01) | |
| *F25J 1/02* | (2006.01) | |
| *G21B 1/19* | (2006.01) | |
| *B29C 47/00* | (2006.01) | |
| *B29C 47/14* | (2006.01) | |
| *B29C 47/92* | (2006.01) | |
| *F25D 19/00* | (2006.01) | |

(52) U.S. Cl.
CPC ...... *B29C 47/0813* (2013.01); *B29C 47/1063* (2013.01); *B29C 47/1072* (2013.01); *B29C 47/805* (2013.01); *B29C 47/864* (2013.01); *B29C 47/866* (2013.01); *F25J 1/001* (2013.01); *F25J 1/002* (2013.01); *F25J 1/0005* (2013.01); *F25J 1/0015* (2013.01); *F25J 1/0017* (2013.01); *F25J 1/0022* (2013.01); *F25J 1/0251* (2013.01); *F25J 1/0276* (2013.01); *G21B 1/19* (2013.01); *B29C 47/0073* (2013.01); *B29C 47/14* (2013.01); *B29C 47/92* (2013.01); *B29C 2947/92704* (2013.01); *B29C 2947/92857* (2013.01); *B29C 2947/92876* (2013.01); *B29C 2947/92904* (2013.01); *F25D 19/00* (2013.01); *F25J 2205/20* (2013.01); *F25J 2215/32* (2013.01); *F25J 2235/04* (2013.01); *F25J 2270/90* (2013.01); *F25J 2280/40* (2013.01); *F25J 2290/12* (2013.01); *Y02E 30/16* (2013.01)

(58) Field of Classification Search
CPC ......... F25J 1/0005; F25J 1/001; F25J 1/0015; F25J 1/0017; F25J 1/002; F25J 1/0022; F25J 1/0251; F25J 1/0276; F25J 1/19; F25J 2205/20
See application file for complete search history.

(56) References Cited

OTHER PUBLICATIONS

Aliaga-Rossel et al., "A cryogenic fiber maker for continuous extrusion," Review of Scientific Instruments, Jun. 1998, vol. 69, No. 6, pp. 2365-2368.

Combs et al., "Extruder system for high-throughput/steady-state hydrogen ice supply and application for pellet fueling of reactor-scale fusion experiments," Review of Scientific Instruments, Nov. 1998, vol. 69, No. 11, pp. 4012-4013.

Sethian et al., "Solid deuterium fiber extruder," Review of Scientific Instruments, Apr. 1987, vol. 58, No. 4, pp. 536-538.

Vinyar et al., "A Screw Extruder for the Centrifugal Injector of Hydrogen and Deuterium Pellets for the JT-60U Tokamak," Instruments and Experimental Techniques, 2006, vol. 49, No. 5, pp. 726-731.

* cited by examiner

DEVICE AND METHOD FOR EXTRUSION OF A SOLID BODY

BACKGROUND OF THE INVENTION

The invention relates to a device for extrusion of a solid film.

STATE OF THE ART

Irradiation of certain solid targets by a high-intensity pulsed laser is currently used in several fields, in particular in experimental research in physics or in the medical field. There is in fact a considerable interest in studying plasmas produced by laser irradiation of solid targets and able to be used in direct reaction experiments in nuclear physics. Furthermore, in the field of proton-therapy, a proton beam can be obtained by focusing a high-intensity pulsed laser on a target, generally made from solid hydrogen or deuterium, at a frequency of about 10 Hz.

It is thus advantageous to have systems enabling production of pure solid targets (LiH, $H_2$, $D_2$, . . . ) able to be used at cryogenic temperatures. For creation of plasmas, for example in the fields referred to above, pure hydrogen or one of its isotopes such as deuterium is often used. Indeed, hydrogen atoms require a lesser quantity of energy to ionize totally, and lose less energy due to continuous braking radiation or "bremsstrahlung" than any other element.

Devices producing solid hydrogen or deuterium essentially use the extrusion technique. These devices are mainly integrated in "tokamaks" to supply the plasmas with fuel.

The article ["Screw extruder for the centrifugal injector of hydrogen and deuterium pellets for the JT-60U tokamak"—I. V. Vinyar et al. —Instruments and experimental techniques, 2006, vol. 49, N° 5, pp. 726-731] describes an extrusion device provided with an extrusion chamber and a heat exchanger using a flux of cooling liquid helium. The heat exchanger enables condensation of the hydrogen isotope placed in the extrusion chamber. When extrusion takes place, the temperature inside the chamber is comprised between 11 and 14 K. The extrusion chamber comprises a screw which serves the purpose of compressing the material to be extruded at pressures of about 5 to 10 MPa. Regulation of the speed of rotation of the screw thus enables extrusion of the hydrogen isotope condensed in the device. This type of device uses the same principle as extrusion devices in the plastics processing field. However, in plastics processing, the temperature of the material to be extruded is increased, whereas for creation of plasmas, work is mainly carried out at cryogenic temperatures and the temperature of the material to be extruded is generally lowered so as to condense it. What is meant by cryogenic temperatures are temperatures of less than about 120 K.

Another deuterium ($D_2$) extrusion device is described in the article ["Solid deuterium fiber extruder"—J. D. Sethian and K. A. Gerber —Review of Scientific Instruments, April 1987, 58(4), pp. 536-538]. This device comprises an oxygen-free copper (OFC) cylinder connected to a cryostat with a continuous flux and means for controlling the temperature of the cylinder. The cryostat uses liquid helium and enables the cylinder comprising the deuterium to be cooled to 4.2 K. A piston arranged inside the cylinder compresses the deuterium in the cylinder thereby resulting in extrusion of the latter.

Extrusion of solid targets, in particular made from hydrogen or deuterium, requires high pressures to be implemented at cryogenic temperatures. Extrusion devices for this reason generally comprise cooling means and additional means for generating a pressure inside the extrusion chamber.

These devices are complex and difficult to manufacture and to integrate with other devices such as "tokamaks" or protontherapy devices. Moreover, an extrusion method using this type of device requires perfect control of several parameters relative to the temperature and to the pressure inside the extrusion chamber, thereby making it complicated to obtain pure solid targets.

OBJECT OF THE INVENTION

In certain applications, a need exists to provide an extrusion device of pure solid targets that is easy to produce, to use, and to integrate in other devices, and in particular without using moving parts.

This requirement tends to be satisfied by providing an extrusion device of a solid film comprising a cell provided with a bottom and with side walls, an input opening to the cell for input of a material designed to form the solid film, an output opening of the solid film for output from the cell, and a device for applying a first temperature to the output opening of the cell and a second temperature in a first zone of the cell distinct from the output opening. Advantageously, the output opening is located underneath the input opening, in the bottom of the cell. The extrusion device further comprises a control circuit imposing on the device for applying the first and second temperatures a first adjustment to form a volume of the material in solid phase inside the cell, said volume sealing off the output opening, and a second adjustment to generate a temperature gradient between the output opening and the first zone so as to generate a pressure in the cell forcing extrusion of the solid film via the output opening.

A method for performing extrusion of a solid film is also provided comprising a step of sealing off the output opening by solidifying the material in the output opening, and a formation step of a volume of said material in solid phase, said volume covering the output opening. The input opening is then closed, and a temperature gradient in said volume is then generated so as to create a pressure in the cell to force extrusion of the solid film via the output opening.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
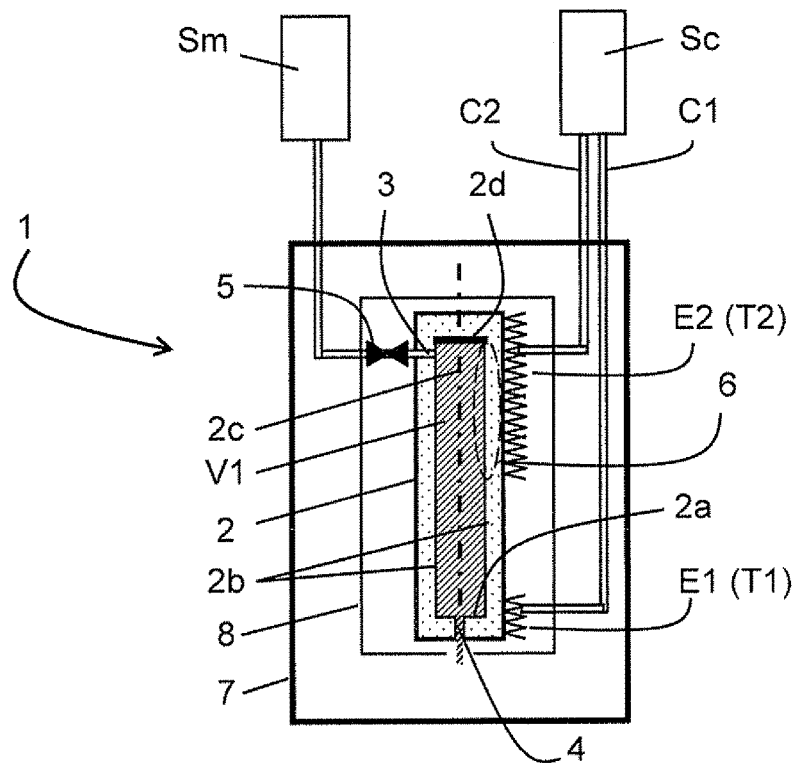
FIG. 1 schematically represents an extrusion device.

As represented in FIG. 1, an extrusion device 1 of a solid film comprises a cell 2 provided with a bottom 2a and with side walls 2b. Extrusion device 1 also comprises an input opening 3 for input to cell 2 of a material designed to form the solid film, and an output opening 4 for the solid film to be output from cell 2, advantageously arranged in bottom 2a. It is naturally understood that input opening 3 and output opening 4 can be situated in other positions than those described in this example. However it is preferable to place input opening 3 above output opening 4 in order to avoid problems of natural convection. Input opening 3 is connected to a distribution source Sm of the material. Bottom 2a is located at the level of a first end of cell 2 which extends along a longitudinal axis 2c. Cell 2 also comprises a top 2d arranged in a second end of cell 2, opposite the first end in the direction of longitudinal axis 2c. Cell 2 delineates an inner volume Vc. What is meant by inner volume Vc is a volume defined by bottom 2a, side walls 2b and top 2d. Input opening 3 is preferably arranged in one of side walls 2b, at the level of the second end of cell 2.

Top 2d is preferably formed by a rupture disk. What is meant by rupture disk is a safety device which serves the purpose of protecting cell 2 against risks of abnormal pressure variations inside cell 2. For example purposes, rupture disk 2 can comprise a tightly sealed membrane which breaks when a previously fixed breaking pressure is reached.

To regulate the temperature inside cell 2, extrusion device 1 comprises a device for applying a first temperature T1 to the output opening 4 of cell 2 and a second temperature T2 in a first zone 6 of cell 2 distinct from output opening 4. First zone 6 of cell 2 is preferably located at top 2d of cell 2 and is distinct from input opening 3. The device for applying first and second temperatures T1 and T2 can comprise a first heat exchanger E1 and a second heat exchanger E2 controlled by thermostats. As illustrated in FIG. 1, first and second heat exchangers E1 and E2 can be supplied by a source Sc of a fluid at cryogenic temperature via a first supply circuit C1 and a second supply circuit C2 independent from one another.

The device for applying first and second temperatures T1 and T2 is governed by a control circuit comprised in extrusion device 1. The control circuit is configured to form a volume V1 of the material in solid phase inside cell 2 in a first stage. A first set of first T1 and second T2 temperatures is chosen in such a way that said volume V1 seals off output opening 4. Said volume V1 sealing off output opening 4 is in contact with bottom 2a and may be in contact with side walls 2b. Volume V1 can represent the whole inner volume Vc of the cell or only a portion of said inner volume Vc.

Preferably, the first set of temperatures is imposed on the device for applying first and second temperatures T1 and T2 at the beginning of input of the material designed to form the solid film via input opening 3. The material can be a material in gas phase and/or in liquid phase. First temperature T1 is chosen to obtain solidification of the material. The second temperature is chosen to leave the material in fluid (gaseous or liquid) state at input opening 3 to achieve filling of cell 2. Depending on the material designed to form the solid film and the value of first temperature T1, the difference between first temperature T1 and second temperature T2, when the first set is chosen, can vary between 0.1 K and 10 K. Advantageously, the difference between first temperature T1 and second temperature T2 does not exceed about 10 kelvin. Indeed, the greater this difference, the greater the heat flux propagating from the hot zone to the cold zone will be, and the more difficult it will be to maintain first temperature T1 at the fixed value. The first set of first T1 and second T2 temperatures imposed by the control circuit in a first stage enables output opening 4 to be sealed off by solidification of the material designed to form the solid film. The first set of first T1 and second T2 temperatures also enables a more or less large quantity of the material to be solidified, after output opening 4 has been sealed off, to form volume V1 of the material in solid phase.

The control circuit is also configured to impose a second set of first T1 and second T2 temperatures to generate a temperature gradient in volume V1. The temperature gradient is in fact applied between output opening 4 and first zone 6 so as to generate a pressure in volume V1 forcing extrusion of the solid film via output opening 4. The temperature gradient is accompanied by an expansion of the volume of the material which generates a pressure increase in cell 2. This configuration enables extrusion of the first material to be forced simply without using moving parts in cell 2 by making use of the pressure exerted on the top and the side walls to obtain extrusion via output opening 4.

Advantageously, the control circuit is configured to completely fill inner volume Vc of cell 2 by the material in solid phase. In other words, volume V1 and inner volume Vc of cell 2 are identical. According to this embodiment, first zone 6 of cell 2 is located at the level of top 2d of cell 2 and is distinct from input opening 3.

As illustrated in FIG. 1, extrusion device 1 advantageously comprises a sealed chamber 7 inside which cell 2 is located so that the solid film extruded by cell 2 is recovered in sealed chamber 7. Extrusion device 1 also comprises means for creating a vacuum in sealed chamber 7. The vacuum created in chamber 7 can be a high vacuum or a vacuum insulation, for example less than 0.1 Pa. A heat shield 8 is preferably fitted between sealed chamber 7 and cell 2. Heat shield 8 envelops cell 2 leaving only output opening 4 uncovered. A heat shield enables the heat inputs by radiation originating from the mechanical parts to be limited thereby enabling cell 2 to be thermally insulated.

Cell 2 is in communication with the vacuum created in sealed chamber 7 via output opening 4 before the latter is sealed off with volume V1. The means for creating a vacuum insulation in sealed chamber 7 thus enable a vacuum to be created in cell 2, before insertion of the first material designed to form the solid film in cell 2. However, the cross-section of output opening 4 can be considered as being too small to envisage use thereof for pumping. It is therefore advantageous to add an additional pumping device connected to output opening 4, dedicated to cell 2. This creation of a vacuum in cell 2 in particular prevents contamination of the material input to cell 2, thereby ensuring an improvement of the purity of the extruded solid film.

Cell 2 may comprise a stopper 5 for closing the input opening 3 to isolate the cell 2 before extrusion. Cell 2, including the stopper 5 may comprise a cooling means disposed at the level of input opening 3. Advantageously, the stopper 5 is made by plug formed by the material itself locally solidified in input opening 3 at first setting to form volume V1. Moreover, stopper 5 can be any known means for isolation of cell 2. For example, stopper 5 may include a mechanical valve, or any other type of valve. Advantageously, stopper 5 comprises a valve configured to regulate the pressure in cell 2. After sealing of output opening 4 by solidification of the material, the valve advantageously enables a predefined pressure to be imposed in cell 2. The valve can thus regulate the pressure in cell 2 to relieve the constraints on the adjustments of the temperature inside cell 2 when solidification of the material takes place in cell 2.

Extrusion device 1 advantageously comprises an injection source Sm of hydrogen ($H_2$) or deuterium ($D_2$) in gas or liquid phase so as to respectively extrude a solid film of hydrogen or deuterium. Extrusion device 1 is thus easily usable in a protontherapy device or in a plasma creation device for applications in experimental physics.

Figure 2:
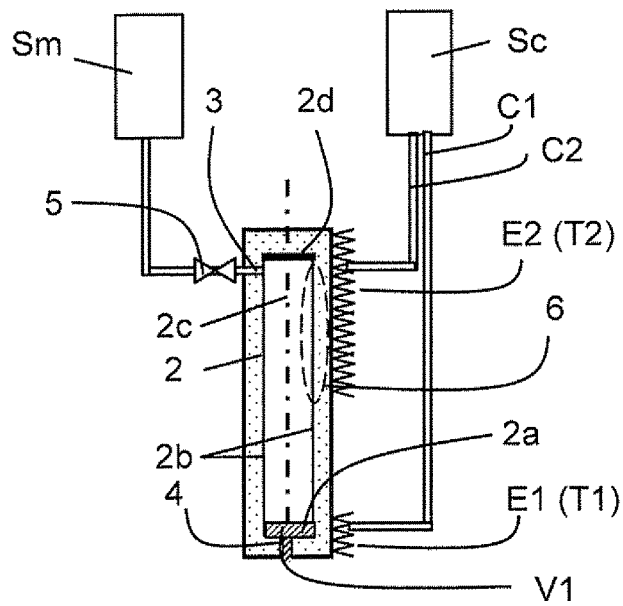
FIGS. 2 to 4 represent steps of a method for extrusion of a solid film using a device according to FIG. 1.
Figure 3:
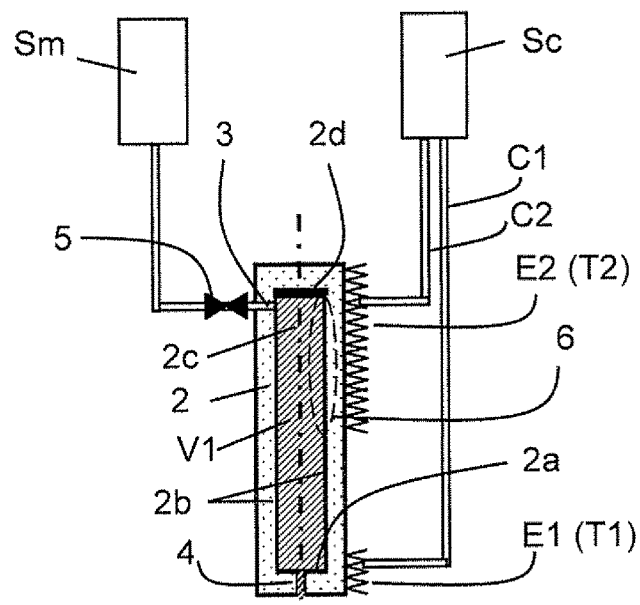
Figure 4:
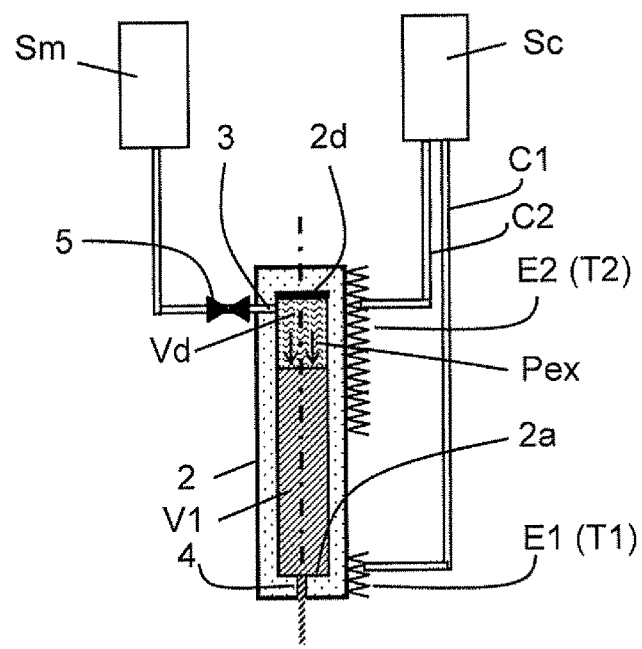

FIGS. 2 to 4 illustrate a particular embodiment of implementation of an extrusion method of a solid film using the device according to FIG. 1. The extrusion method comprises a step of sealing off output opening 4. A vacuum is preferably initially created in cell 2. As illustrated in FIG. 2, output opening 4 is sealed off by solidifying material M1 in output opening 4. After output opening 4 has been sealed off, volume V1 based of material M1 is formed in cell 2. As illustrated in FIG. 3, volume V1 is in contact with side walls 2b and covers output opening 4. Advantageously, volume V1 occupies the whole of inner volume Vc of cell 2. After formation of a volume based of material M1 in solid phase, input opening 3 is closed and extrusion device 1 generates a temperature gradient in volume V1. As illustrated in FIG. 4, the temperature gradient is generated so as to generate a pressure Pex in cell 2 to force extrusion of the solid film via output opening 4. Indeed, the control circuit of extrusion device 1 imposes a set of first and second temperatures T1 and T2 so as to create a temperature gradient between first zone 6 and output opening 4. The temperature gradient enables expansion of a part Vd of volume V1 so as to generate pressure Pex in cell 2. The temperature gradient is chosen such that the generated pressure Pex forces extrusion of the solid film via output opening 4. Preferably, as extrusion of the solid film takes place, second temperature T2 is modified so as to keep a substantially constant pressure Pex at the level of output opening 4, thereby ensuring continuity of extrusion of the solid film.

First material M1 is advantageously a cryogenic fluid. What is meant here by cryogenic fluid are the materials of table 1 below. Table 1 represents materials able to be extruded by the device and the values of the temperatures of the triple point of these materials.

TABLE 1

| | Gas | | | | | | |
|---|---|---|---|---|---|---|---|
| | $H_2$ | $D_2$ | Ne | $O_2$ | $N_2$ | Ar | $CH_4$ |
| Triple point temperature (K) | 13.95 | 18.73 | 24.5 | 54.4 | 63.14 | 84 | 89 |

According to this embodiment, sealing of output opening 4 is performed, in a first stage, by maintaining output opening 4 at a first temperature T1$i$ that is lower than temperature T0 of the triple point of the cryogenic fluid.

Furthermore, first zone 6, distinct from output opening 4, is maintained at a second temperature T2$i$ higher than temperature T0 of the triple point of the cryogenic fluid, which enables cryogenic fluid M1 to be left in fluid (gaseous or liquid) state at the level of input opening 3. In other words, solidification of cryogenic fluid M1 at the level of input opening 3 is prevented to enable flow of the cryogenic fluid to output opening 4. Input of cryogenic fluid M1 to cell 2 is advantageously performed with a pressure P0 in cell 2, to enable solidification of cryogenic fluid M1 at output opening 4. For example purposes, the valve of stopper 5 which regulates the flowrate of cryogenic fluid M1 in cell 2 can be adjusted so as to obtain a pressure P0 in cell 2. The value of pressure P0 can also be chosen so as to reduce the time necessary for solidification, at temperature T1$i$, of cryogenic fluid M1 in output opening 4. Advantageously, pressure P0 is chosen such as to obtain immediate solidification of cryogenic fluid M1 in output opening 4. The difference between temperature T0 of the triple point of cryogenic fluid M1 and first temperature T1$i$ is preferably comprised between 2 and 5 K, and/or the difference between second temperature T2$i$ and temperature T0 of the triple point of cryogenic fluid M1 is comprised between 2 and 5 K. The temperature difference between output opening 4 and first zone 6 advantageously enables cryogenic fluid M1 to be solidified at the level of bottom 2a of the cell, and to progressively fill cell 2 with non-solidified cryogenic fluid M1

Advantageously, after output opening 4 has been sealed off, second temperature T2 in first zone 6 is lowered and maintained at a temperature T2$i'$ substantially equal to first temperature T1$i$ i at output opening 4. In other words, second temperature T2 is preferably maintained at a temperature of 2 to 5 K below temperature T0 of the triple point of cryogenic fluid M1. The temperature decrease of first zone 6 advantageously enables formation of volume V1 by solidification of cryogenic fluid M1. Volume V1 is in contact with first zone 6, in other words it covers bottom 2a and is in contact with side walls 2b.

Preferably, reduction of the second temperature T2 is performed after cell 2 has been completely filled by cryogenic fluid M1. Volume V1 of solidified cryogenic fluid M1 thus occupies the whole inner volume Vc of cell 2. Input opening 3 is then closed and a temperature gradient is applied between output opening 4 and first zone 6 to generate a pressure forcing extrusion of the solid film. When volume V1 occupies the whole inner volume Vc of cell 2, the closure of input opening 3 is performed by forming said volume V1. Moreover, as mentioned above, the closure of the input opening 3 can also be performed by a plug formed by solidified material M1 in the input opening 3 when forming volume V1. The sealing of the input opening 3 is advantageously achieved by closing the valve of stopper 5.

In the field of extrusion of solid films, the minimum pressure applied to a solid material in an extrusion chamber to extrude the latter is proportional to the shear strength of said material in the vicinity of the extrusion opening. Furthermore, it is known that the shear strength of a material in solid phase, in particular a solidified cryogenic fluid, decreases when its temperature is close to that of the triple point. It is thus advantageous to reduce the shear strength of material M1 in the vicinity of output opening 4 before generating the pressure forcing extrusion. In other words, first temperature T1 at output opening 4 is maintained at a substantially equal temperature to temperature T0 of the triple point of material M1, when extrusion of the solid film is performed.

The extrusion method described in the foregoing advantageously enables a pressure to be generated in cell 2 forcing extrusion of a solid film without the use of a moving mechanical part in cell 2 during extrusion. Application of a temperature gradient between output opening 4 and first zone 6 enables expansion of a portion Vd of volume V1 which therefore acts as a virtual piston compressing material M1 in solid phase in the direction of output opening 4. The intensity of expansion of portion Vd of volume V1, and therefore the extrusion rate of the solid film, depends on the amplitude of the temperature gradient applied between first zone 6 and output opening 4. It is thus possible to govern the extrusion rate of the solid film by varying the second temperature T2. In other words, extrusion of the solid film is performed with a rate that is regulated by the set of second temperature T2 to first zone 6 distinct from output opening 4. Indeed, when the extrusion step is performed, modification of second temperature T2 at the level of first zone 6 enables the pressure exerted in volume V1 to be modified and thereby enables the extrusion rate of the solid film through output opening 4 to be modified. Second temperature T2 is preferably regulated with a precision of about one hundredth of a kelvin so as to control the extrusion rate of the solid film in efficient and precise manner.

For example purposes, a cell having an inner volume of 10 cm$^3$ was produced according to the invention. The cell was provided with an input opening with a diameter of about 1 mm and an output opening with a cross-section of about 0.1 mm$^2$. Using hydrogen as material to be extruded, first temperature T1 was fixed at about 13 K and second temperature was fixed at about 20 K. This configuration of the cell and these conditions enabled a film of solid hydrogen with a length of about 100 m to be extruded. The extruded solid hydrogen film had a thickness of about 100 μm and a width of about 1 mm.

The invention claimed is:

1. An extrusion device of a solid film comprising:
    a cell provided with an input opening to the cell for input of a material designed to form the solid film, and an output opening of the solid film from the cell, the cell comprising a stopper at a level of the input opening configured to close the input opening;
    a first heat exchanger configured to apply a first temperature to the output opening of the cell;
    a second heat exchanger configured to apply a second temperature in a first zone of the cell distinct from the output opening;
    a control circuit configured for controlling the first and second heat exchangers so as to impose:
        a first set of first and second temperatures to form a volume of the material in solid phase inside the cell, said volume sealing off the output opening;
        a second set of first and second temperatures to generate a temperature gradient between the output opening and the first zone so as to generate a pressure in the cell forcing extrusion of the solid film via the output opening, in which the input opening is closed prior to the second set of first and second temperatures being imposed.

2. The extrusion device according to claim 1, wherein the output opening is situated below the input opening.

3. The extrusion device according to claim 1, wherein the control circuit imposes a third set of first and second temperatures so as to completely fill the inner volume of the cell with said material in solid phase.

4. The extrusion device according to claim 1, comprising a sealed chamber inside which the cell is located and comprising a pump configured to create a vacuum in the sealed chamber.

5. The extrusion device according to claim 1, comprising an injection source of hydrogen or deuterium in gas or liquid phase so as to respectively extrude a solid film of hydrogen or deuterium.

6. The extrusion device according to claim 1, wherein the stopper comprises a valve configured to regulate the pressure in the cell.

7. The extrusion device according to claim 6, wherein the stopper comprises a cooler.

8. A method for extrusion of a solid film using a device according to claim 1, comprising the following successive steps:
    sealing off the output opening by solidifying the material in the output opening;
    forming a volume of the material in solid phase, said volume covering the output opening;
    closing the input opening;
    generating a temperature gradient in said volume so as to generate a pressure in the cell to force extrusion of the solid film via the output opening.

9. The method for extrusion according to claim 8, wherein the material is a cryogenic fluid and sealing of the output opening comprises the following steps:
    maintaining the output opening at a first temperature lower than the temperature of the triple point of the cryogenic fluid, and the first zone at a second temperature higher than the temperature of the triple point of the cryogenic fluid;
    input of the cryogenic fluid to the cell with a pressure in the cell enabling solidification of the cryogenic fluid at the output opening.

10. The method for extrusion according to claim 8, wherein the material is a cryogenic fluid and sealing of the output opening comprises the following steps:
    maintaining the output opening at a first temperature lower than the temperature of the triple point of the cryogenic fluid, and the first zone at a second temperature higher than the temperature of the triple point of the cryogenic fluid;
    input of the cryogenic fluid to the cell with a pressure in the cell enabling solidification of the cryogenic fluid at the output opening;
    after sealing of the output opening, the second temperature in the first zone is maintained at a substantially equal temperature to the first temperature at the output opening so as to form the volume based of solidified cryogenic fluid, the first zone being in contact with the volume.

11. The method for extrusion according to claim 8, wherein before generation of the temperature gradient to force extrusion of the solid film, the first temperature at the output opening is maintained at a substantially equal temperature to the temperature of the triple point of the material.

12. The method for extrusion according to claim 8, wherein the solid film is extruded with a rate regulated by adjustment of the second temperature in the first zone of the cell.

13. An extrusion device of a solid film comprising:
    a cell provided with an input opening to the cell for input of a material designed to form the solid film, and an output opening of the solid film from the cell;
    a first heat exchanger configured to apply a first temperature to the output opening of the cell;
    a second heat exchanger configured to apply a second temperature in a first zone of the cell distinct from the output opening;
    a control circuit configured for controlling the first and second heat exchangers so as to impose:
        a first set of first and second temperatures to form a volume of the material in a solid phase inside the cell, said volume sealing off the output opening;
        a second set of first and second temperatures to generate a temperature gradient between the output opening and the first zone so as to generate a pressure in the cell forcing extrusion of the solid film via the output opening, in which the input opening is closed prior to the second set of first and second temperatures being imposed,
    wherein the input opening comprises a cooler configured to solidify the material in the input opening to close the input opening.

* * * * *